United States Patent
Falk et al.

(10) Patent No.: US 8,909,927 B2
(45) Date of Patent: Dec. 9, 2014

(54) METHOD FOR PROCESSING MESSAGES AND MESSAGE PROCESSING DEVICE

(75) Inventors: Rainer Falk, Erding (DE); Florian Kohlmayer, Starnberg (DE)

(73) Assignee: Continental Automotive GmbH, Hannover (DE)

( * ) Notice: Subject to any disclaimer, the term of this patent is extended or adjusted under 35 U.S.C. 154(b) by 968 days.

(21) Appl. No.: 12/291,490

(22) Filed: Nov. 10, 2008

(65) Prior Publication Data

US 2009/0133121 A1 May 21, 2009

(30) Foreign Application Priority Data

Nov. 8, 2007 (DE) .......................... 10 2007 053 255

(51) Int. Cl.
| | |
|---|---|
| *H04L 29/06* | (2006.01) |
| *H04L 9/32* | (2006.01) |
| *G08G 1/0962* | (2006.01) |
| *G08G 1/0967* | (2006.01) |
| *H04L 12/58* | (2006.01) |
| *H04W 12/10* | (2009.01) |
| *G08G 1/09* | (2006.01) |
| *H04L 9/00* | (2006.01) |
| *H04M 3/533* | (2006.01) |
| *G06F 15/16* | (2006.01) |

(52) U.S. Cl.
CPC ............... *H04L 63/123* (2013.01); *H04L 9/32* (2013.01); *H04L 9/00* (2013.01); *H04M 3/5335* (2013.01); *G06F 15/16* (2013.01); *H04L 29/06* (2013.01); *G08G 1/0962* (2013.01); *G08G 1/096716* (2013.01); *G08G 1/09675* (2013.01); *G08G 1/096791* (2013.01); *H04L 12/5895* (2013.01); *H04L 51/26* (2013.01); *H04L 51/38* (2013.01); *H04W 12/10* (2013.01); *G08G 1/093* (2013.01)

USPC ............ 713/168; 713/176; 713/166; 709/206

(58) Field of Classification Search
CPC ............................... H04L 9/32; H04M 3/5335
USPC ........................ 713/168, 176, 166; 709/206
See application file for complete search history.

(56) References Cited

U.S. PATENT DOCUMENTS 4,914,434 A * 4/1990 Morgan et al. ............... 340/906
5,465,289 A * 11/1995 Kennedy, Jr. ................. 455/424

(Continued)

FOREIGN PATENT DOCUMENTS

| EP | 1397007 A2 * | 3/2004 |
|---|---|---|
| EP | 1975900 | 10/2008 |

OTHER PUBLICATIONS

Johansson et al., "Vehicle Applications of Controller Area Network".*

(Continued)

*Primary Examiner* — O C. Vostal
(74) *Attorney, Agent, or Firm* — Cozen O'Connor

(57) ABSTRACT

A message processing device for processing messages has at least one reception buffer, a message includes at least one authentication element and one message content. The message is received and stored in the reception buffer. A characteristic variable of a priority for security checking of the message is determined as a function of the message content. A processing sequence for further message processing for the security checking, taking into account the at least one authentication element of the messages in the reception buffer is defined and carried out as a function of the characteristic variable.

24 Claims, 4 Drawing Sheets

(56) References Cited

U.S. PATENT DOCUMENTS

| | | | |
|---|---|---|---|
| 5,497,371 A * | 3/1996 | Ellis et al. | 370/412 |
| 5,592,622 A * | 1/1997 | Isfeld et al. | 709/207 |
| 5,809,241 A * | 9/1998 | Hanel et al. | 709/206 |
| 6,167,255 A * | 12/2000 | Kennedy et al. | 455/414.1 |
| 6,289,464 B1 * | 9/2001 | Wecker et al. | 713/300 |
| 6,321,267 B1 * | 11/2001 | Donaldson | 709/229 |
| 6,405,033 B1 * | 6/2002 | Kennedy et al. | 455/414.1 |
| 6,438,135 B1 * | 8/2002 | Tzeng | 370/412 |
| 6,687,587 B2 * | 2/2004 | Kacel | 701/36 |
| 7,165,076 B2 * | 1/2007 | Bentley | 1/1 |
| 7,216,233 B1 * | 5/2007 | Krueger | 713/176 |
| 7,233,781 B2 * | 6/2007 | Hunter et al. | 455/404.1 |
| 7,415,620 B2 * | 8/2008 | England et al. | 713/193 |
| 7,559,080 B2 * | 7/2009 | Bhargavan et al. | 726/1 |
| 7,769,035 B1 * | 8/2010 | Breau et al. | 370/412 |
| 7,843,869 B2 * | 11/2010 | Ikawa et al. | 370/328 |
| 7,991,411 B2 * | 8/2011 | Johnson et al. | 455/466 |
| 8,055,757 B2 * | 11/2011 | Watkins | 709/224 |
| 2001/0012976 A1 * | 8/2001 | Menig et al. | 701/1 |
| 2002/0019853 A1 * | 2/2002 | Vange et al. | 709/207 |
| 2002/0023159 A1 * | 2/2002 | Vange et al. | 709/228 |
| 2002/0032853 A1 * | 3/2002 | Preston et al. | 713/151 |
| 2002/0056006 A1 * | 5/2002 | Vange et al. | 709/235 |
| 2002/0174227 A1 * | 11/2002 | Hartsell et al. | 709/226 |
| 2003/0084100 A1 * | 5/2003 | Gahan et al. | 709/203 |
| 2003/0130893 A1 * | 7/2003 | Farmer | 705/14 |
| 2003/0172220 A1 * | 9/2003 | Hao | 710/305 |
| 2003/0182054 A1 * | 9/2003 | Peterson et al. | 701/207 |
| 2003/0216889 A1 * | 11/2003 | Marko et al. | 702/182 |
| 2003/0236745 A1 * | 12/2003 | Hartsell et al. | 705/40 |
| 2004/0203696 A1 * | 10/2004 | Jijina et al. | 455/420 |
| 2004/0210757 A1 * | 10/2004 | Kogan et al. | 713/182 |
| 2004/0254998 A1 * | 12/2004 | Horvitz | 709/206 |
| 2005/0054346 A1 * | 3/2005 | Windham et al. | 455/445 |
| 2005/0216147 A1 * | 9/2005 | Ferman | 701/29 |
| 2005/0268102 A1 * | 12/2005 | Downey | 713/176 |
| 2006/0010217 A1 * | 1/2006 | Sood | 709/206 |
| 2006/0031374 A1 * | 2/2006 | Lu et al. | 709/207 |
| 2006/0053146 A1 * | 3/2006 | Allhusen et al. | 707/102 |
| 2006/0168013 A1 * | 7/2006 | Wilson et al. | 709/206 |
| 2006/0232439 A1 * | 10/2006 | Reumermann | 340/905 |
| 2007/0036301 A1 * | 2/2007 | Voticky et al. | 379/88.22 |
| 2007/0071021 A1 * | 3/2007 | Girao | 370/411 |
| 2007/0077917 A1 * | 4/2007 | Kim | 455/411 |
| 2007/0156919 A1 * | 7/2007 | Potti et al. | 709/238 |
| 2007/0198397 A1 * | 8/2007 | McGinley et al. | 705/37 |
| 2007/0230495 A1 * | 10/2007 | Li | 370/412 |
| 2007/0253412 A1 * | 11/2007 | Batteram et al. | 370/389 |
| 2008/0040029 A1 * | 2/2008 | Breed | 701/208 |
| 2008/0046966 A1 * | 2/2008 | Rhoades et al. | 726/2 |
| 2008/0126804 A1 * | 5/2008 | Zhang et al. | 713/169 |
| 2008/0228849 A1 * | 9/2008 | Watkins | 709/201 |
| 2008/0291935 A1 * | 11/2008 | Campion et al. | 370/412 |
| 2008/0310440 A1 * | 12/2008 | Chen et al. | 370/413 |
| 2009/0028142 A1 * | 1/2009 | Schmidt et al. | 370/389 |
| 2009/0049143 A1 * | 2/2009 | Tarrago | 709/206 |
| 2009/0300673 A1 * | 12/2009 | Bachet et al. | 725/31 |
| 2010/0080133 A1 * | 4/2010 | Oron | 370/252 |

OTHER PUBLICATIONS

Shaw et al., "An Introduction to FlexRay as an Industrial Network", 2008.*

Xiao, "Performance Analysis of Ieee 802.11e EDCF under Saturation Condition", 2004.*

Kaiser et al., "COSMIC: A middleware for event-based interaction on CAN", 2003.*

Kim et al., "Resource-Conscious Customization of CORBA for CAN-based Distributed Embedded Systems".*

Kaiser et al., "Implementing the Real-Time Publisher/Subscriber Model on the Controller Area Network (CAN)".*

Meier, "5.9 GHz Dedicated Short Range Communication Design of a Vehicular Safety Communication Architecture", 2005.*

Hiller et al., "Results from the WILLWARN Project", 2007.*

C. Cristopher Kellum; Six Application Mechanisms Required for Wireless Access in Vehicular Environments (Wave); Vehicular Technology Conference, 2007; date: Apr. 1, 2007; pp. 2585-2589; XP 031093098; ISBN: 978-1-4244-0266-3; published in Russelheim—Germany.

Christine Laurendeaum and Michel Barbeau; Secure Anonymous Broadcasting in Vehicular Networks; Local Computer Networks 2007, 32$^{nd}$ IEEE Conference on, IEEE, PI; date: Oct. 1, 2007; pp. 661-668; XP 031153108; ISBN: 978-0-7695-3000-0; Section III. Vehicular Network Model Section IV. SAB Protocol; p. 662, right column—p. 665, left column; published in Ottawa, Canada.

* cited by examiner

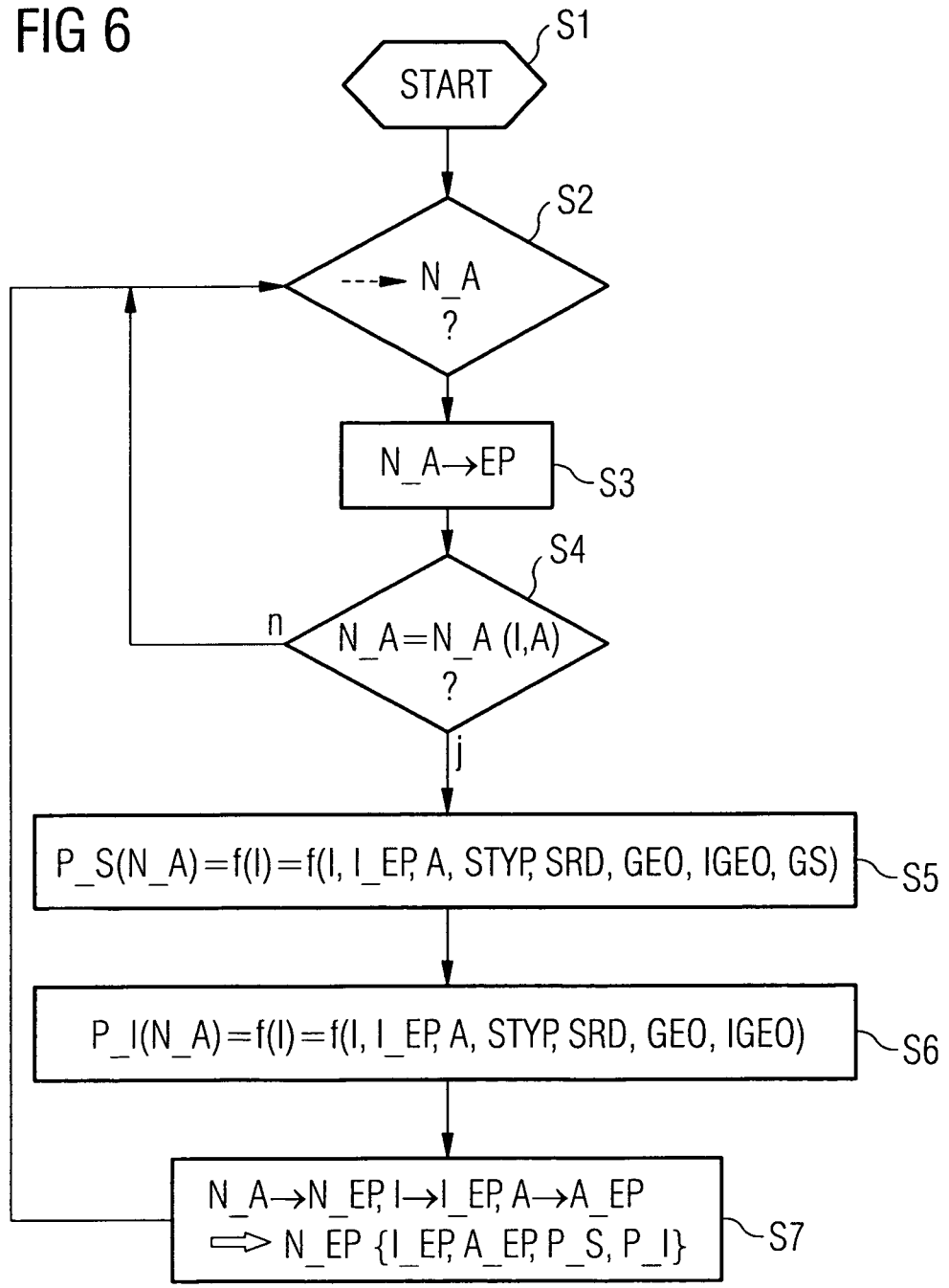

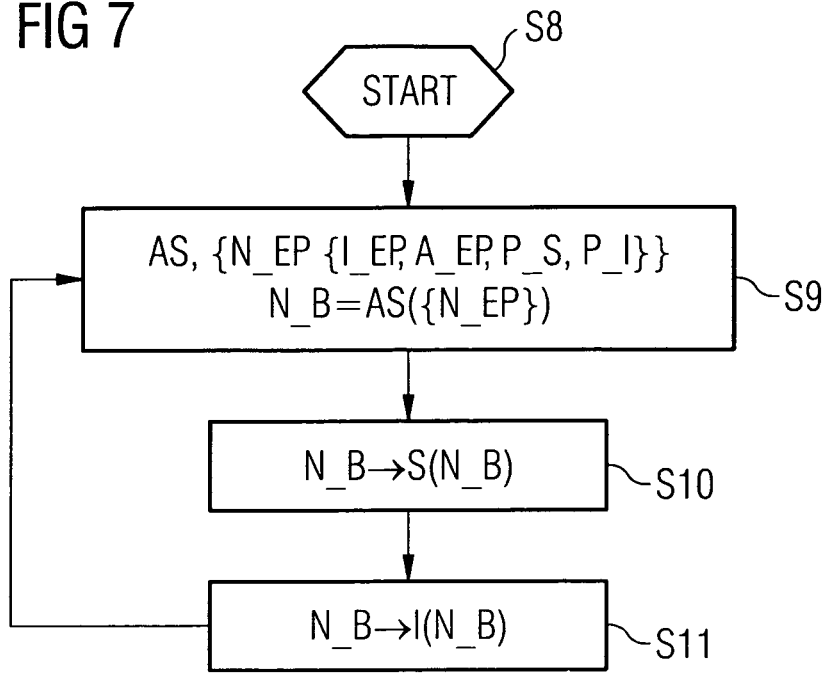
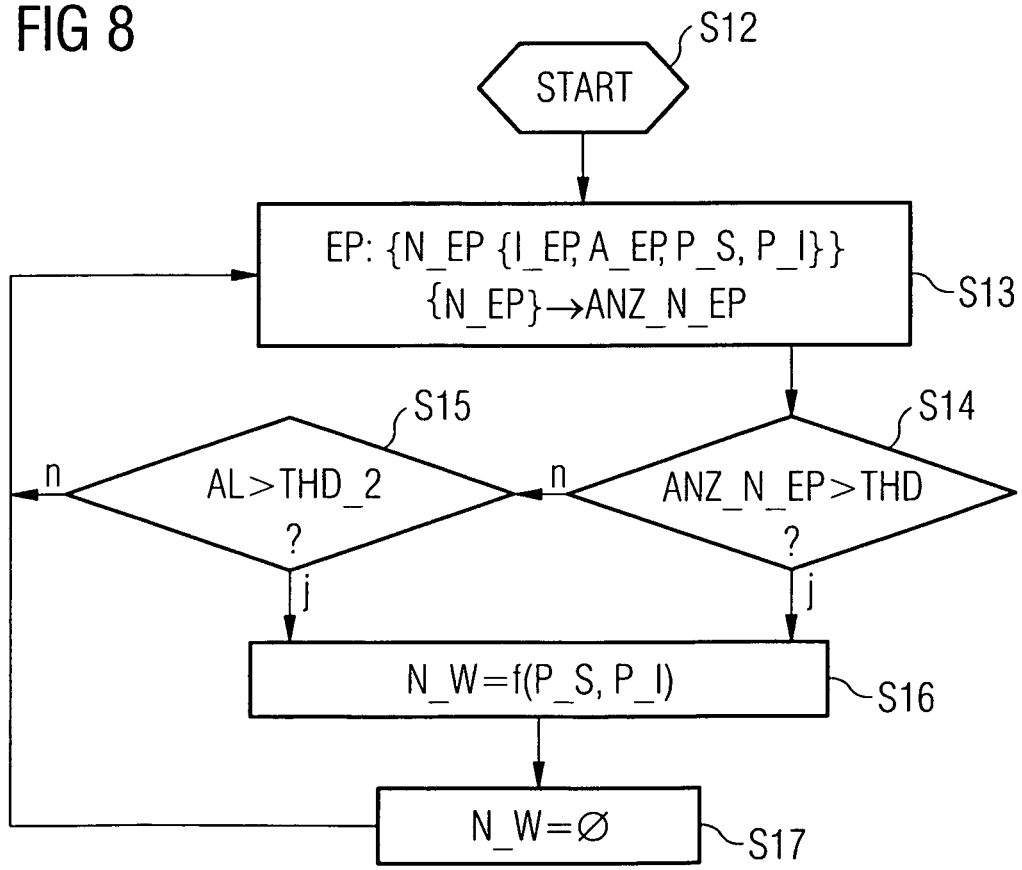

METHOD FOR PROCESSING MESSAGES AND MESSAGE PROCESSING DEVICE

BACKGROUND OF THE INVENTION

1. Field of the Invention

The invention relates to a method for processing messages in a message processing device and to a message processing device.

2. Description of the Related Art

In order to exchange information and improve safety in road traffic, vehicles communicate with one another and with infrastructure sensors. Infrastructure sensors are fixed data stations, referred to as roadside units. A vehicle receives messages from other vehicles or from roadside units which comprise traffic flow information, warnings about ice on the road or warnings about accidents. Due to such communication, a vehicle receives a large number of messages, for example in the form of what are referred to as wireless short message (WSM). The WSMs are processed in a linear sequence according to the IEEE 1609 standard. According to the IEEE 1609.2 standard, the WSMs are protected by a digital signature, which permits security checking of the message and allows detection of manipulation. Such security checking is very demanding in terms of computing power and storage capacity of the unit, which receives the message in the vehicle due to the high rate of incoming messages.

SUMMARY OF THE INVENTION

An object of the invention is to provide a method and a device for processing messages, which permits rapid and reliable message processing.

One embodiment of the invention is a method for processing messages in a message processing device which has at least one reception buffer, wherein the message comprises at least one authentication element and one message content. The message is received and stored in the reception buffer. A characteristic variable of a priority for security checking of the message is determined as a function of the message content. A processing sequence for further message processing for the security checking, taking into account the at least one authentication element of the message in the reception buffer, is defined and carried out as a function of the values of the characteristic variable of the priority for the security checking of the message.

IOE security checking of the message is performed as a function of message content. Typically, further processing of the content of a message takes place within the scope of the security checking. The message is, for example, a WSM received from a vehicle by radio. In order to permit security checking of the message, the message comprises at least one authentication element in addition to the message content. The authentication element comprises, for example, a cryptographic checksum (message authentication code) and/or a digital signature and/or a digital certificate and/or a chain of certificates or the like. Due to the authentication element, it is possible to verify the transmitter and to check the integrity of the signed, electronic data.

As a result of determining priorities, it is possible to define a processing sequence and to adapt processing of the messages to specific requirements. The determination of the characteristic variable of the priority for security checking as a function of the message content can take place, in particular, within the scope of pre-processing the message content. The determination of the characteristic variable of the priority for security checking can be carried out as a function of the message content with comparatively little computing complexity compared to the security checking. In this way, the available computing resources and/or memory resources for the further message processing, which can comprise both security checking and further processing the content of the message, can be used in a targeted fashion for effective processing of the messages.

In one embodiment, the characteristic variable of the priority for security checking of the message is determined as a function of at least one authentication element of the message, which permits information relating to the transmitter to be considered in the determination of the characteristic variable of the priority for the security checking.

In one embodiment, the security checking is defined as a function of transmitters which are already known. In other words, in the case of known transmitters the security checking is shifted to a later time and to perform security checks of messages from unknown transmitters. It is also possible to detect, based on the at least one authentication element, which transmitter type is present and whether the transmitter is a mobile transmitting unit or a locationally fixed or stationary transmitting unit. For a stationary transmitting unit, a characteristic variable of the priority for security checking which results in preferred processing of the message is preferably predefined.

In one embodiment, the characteristic variable of the priority for security checking of the message is determined as a function of the determination of an imminent hazardous situation. The imminent hazardous situation is identified as a function the message content of a message or further message content of other messages. The determination of the imminent hazardous situation includes at least detection of imminent vehicle collisions. In this way it is possible for security checking to be carried only if a collision is being considered. This means that security checking is carried out only on messages which have led to the detection of the imminent collision. The security checking of individual messages can therefore be avoided.

In one embodiment, the value of the characteristic variable of the priority for the security checking of individual messages is changed in such a way that processing of the respective message for the security checking of the respective message is preferred over processing of the further messages in the reception buffer. Messages from vehicles for which a collision has not been taken into account, or a collision has been taken into account with a low probability, can be classified as relevant to the risk of a collision as a function of the message content.

In one embodiment, the characteristic variable of the priority for security checking of the respective message is determined as a function of a type of the message content. This permits, for example, messages with warnings of accidents to be processed with preference over messages with weather information. This increases safety in road traffic.

In one embodiment, the characteristic variable of the priority for the security checking of the message is determined as a function of a relevance of the message content for a predefined geographic region. The predefined geographic region is preferably the location of the vehicle in question and its immediate surroundings. As a result, messages for a nearby location can be processed with preference over messages which relate to locations at a greater distance. Preferably, the direction of travel of the vehicle in question and the speed are evaluated in such way that a region that will be traveled through in the near future is determined and messages which relate to this region can be processed with preference. In addition, different geographic regions can be predefined for different message contents, for example a larger geographic region can be predefined for traffic flow information than for safety-related information.

In one embodiment, the characteristic variable of the priority for security checking of the respective message is determined as a function of available information about the predefined geographic region. In particular, the information is made available independently of the respective message. The advantage is that in this way messages which relate to a geographic region about which no information or only little information is available can be processed with preference. Processing can take place independently of other aspects of the type of message content of the respective message.

In one embodiment, the characteristic variable of the priority for security checking of the respective message is determined as a function of sensor data of at least one sensor which is assigned to the message processing device. The sensor is, for example, a sensor for determining a speed of a vehicle. As a result it is possible for received messages which only have message contents which are already known through sensor data to be processed at a later time. For example, an incoming warning of a traffic jam with a relatively low priority can therefore be processed if the vehicle is already stationary or is moving at a low speed, for example less than 10 km/h.

In one embodiment, the characteristic variable of the priority for security checking of the respective message is determined as a function of a difference between the message content and further message contents of the messages which are stored in the reception buffer. In this way, a plurality of unprocessed messages which have a similar message content and of which individual messages are preferred in the further message processing can be combined. Similar message contents occur, for example, if they are in the same context.

In one embodiment, the characteristic variable of the priority for security checking of the respective message is determined as a function of a predefined transmitter type. In this way, messages of a specific transmitter type can be processed with preference. For example, messages of locationally fixed transmitting units, which may be roadside units, can be processed with preference.

In one embodiment, the value of the characteristic variable of the priority for security checking of individual messages is changed in such a way that, if the transmitter type of the message is a stationary transmitting unit, processing of the respective message for the security checking of the respective message is preferred over processing of the further messages in the reception buffer if the transmitter type of the messages is a mobile transmitting unit. In this way, messages from a stationary transmitting unit such as a roadside unit, can be processed with preference over the messages which are transmitted by other vehicles.

In one embodiment, depending on the storage capacity of the reception buffer, the messages in the reception buffer are rejected as a function of the values of the characteristic variable of the priority for security checking of the messages. The rejection of messages preferably starts with messages with the lowest priority if a first, predefined threshold value of a number of messages in the reception buffer is exceeded. The first threshold value is selected, for example, in such a way that 90% or some other amount of the storage capacity of the reception buffer is occupied by the messages. In this way, the security checking of individual messages can be avoided. This permits rapid and at the same time reliable processing of the messages.

In one embodiment, depending on the capacity utilization of a first computing unit of the message processing device, the messages in the reception buffer are rejected as a function of the values of the characteristic variable of the priority for the security checking of the messages. The rejection of messages preferably starts with messages with the lowest priority if the capacity utilization of the first computing unit of the image processing device exceeds a second predefined threshold value. The second threshold value is, for example, selected in such a way that 90% or some other amount of the capacity of the first computing unit of the message processing device is utilized. In this way, it is possible to avoid the security checking of individual messages. This permits rapid and at the same time reliable processing of the messages.

In one embodiment, the message processing for the security checking as a function of the at least one authentication element of the respective message is carried out in a reduced form. In this way, security checks can be carried out in a simplified way when, for example, there is at least one authentication element which is known, such as the digital certificate which has already been checked. It is therefore advantageously possible to dispense with checking a chain of certificates or parts thereof. This permits rapid and reliable processing of the messages.

In one embodiment, a characteristic variable of a priority for message content of the respective message is determined as a function of the message content. The processing sequence for the further message processing of the messages in the reception buffer is defined and carried out as a function of the values of the characteristic variable of the priority for security checking, and of the characteristic variable of the priority for the message content of the messages. The determination of the characteristic variable of the priority for the message content as a function of the message content includes pre-processing of the message content. The pre-processing of the message content comprises, for example, determination of the transmitter and/or key words in the message content. In this way, message contents can be processed with preference as a function of message content, specifically independent of their priority for the security checking. Typically, further processing of the message contents takes place within the scope of the security checking. This permits rapid processing of the messages and at the same time accurate sensing of the surroundings.

In one embodiment, the characteristic variable of the priority for the message content of the message is determined as a function of the difference between the message content and the message contents of the messages stored in the reception buffer. In this way, a plurality of unprocessed messages which have similar message content and of which individual messages are preferred in the further message processing with respect to the message content can be combined. Similar message contents occur, for example, if they are in the same context.

In one embodiment, the characteristic variable of the priority for the message content of the respective message is determined as a function of a predefined transmitter type. In this way, messages of a specific transmitter type can be processed with preference, for example, messages from stationary transmitting units.

In one embodiment, the characteristic variable of the priority for the message content of the respective message is determined as a function of at least one authentication element of the respective message. This has the advantage that messages from a known transmitter are processed with preference.

In one embodiment, based on the storage capacity of the reception buffer, the messages in the reception buffer are rejected as a function of the values of the characteristic variable of the priority for the message content. The rejection of messages starts with messages with the lowest priority. In this way it is possible to avoid processing individual messages. This permits rapid and at the same time reliable processing of the other messages.

In one embodiment, based on the capacity utilization of the first computing unit of the message processing device, the messages in the reception buffer are rejected as a function of the values of the characteristic variable of the priority for the message content. The rejection of messages starts with messages with the lowest priority. In this way it is possible to avoid security checking individual messages. This permits rapid and at the same time reliable processing of the messages.

In one embodiment, the message processing device for processing the respective message comprises the first computing unit and a security module having a further computing unit. The message processing device is designed to carry out message processing of the respective message for the security checking in the first computing unit or in security module as a function of the values of the characteristic variable of the priority for security checking of the respective message. This has the advantage that messages which are classified as preferred can be processed on the security module for the security checking while, depending on the capacity, the processing of other messages for security checking is carried out in the first computing unit.

According to one embodiment the invention, a message processing device for processing messages, wherein a message comprises at least one authentication element and one message content. The message processing device has at least one reception buffer and it receives the message, stores the message in at least one reception buffer and determines a characteristic variable of a priority for security checking of the message as a function of the message content. A processing sequence for further message processing for the security checking taking into account the at least one authentication element of the messages in the reception buffer as a function of the values of the characteristic variable of the priority for the security checking of the messages is defined and carried out by the message processing device. In this way, the processing of messages for their security checking can be carried out with preference as a function of the message content. The advantage is rapid message processing and at the same time accurate sensing of the surroundings.

In one embodiment, the message processing device comprises at least one first computing unit and at least one security module having at least one further computing unit. The message processing device is designed to carry out message processing for security checking of the message in the first computing unit or in the security module as a function of values of the characteristic variable of the priority for security checking of the respective message. This has the advantage that messages which have been classified as preferred can be processed on the security module for the security checking.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are explained below with reference to the schematic drawings, in which:

FIG. 6 is a flowchart of a program for receiving messages and determining characteristic variables of priorities;
FIG. 7 is a flowchart of a program for processing received messages by means of characteristic variables of priorities;
and
FIG. 8 is a flowchart of a program for rejecting received messages on the basis of characteristic variables of priorities.

Elements with the same design or function are provided with the same reference symbols in all the figures.

DETAILED DESCRIPTION OF THE PRESENTLY PREFERRED EMBODIMENTS

Figure 1:
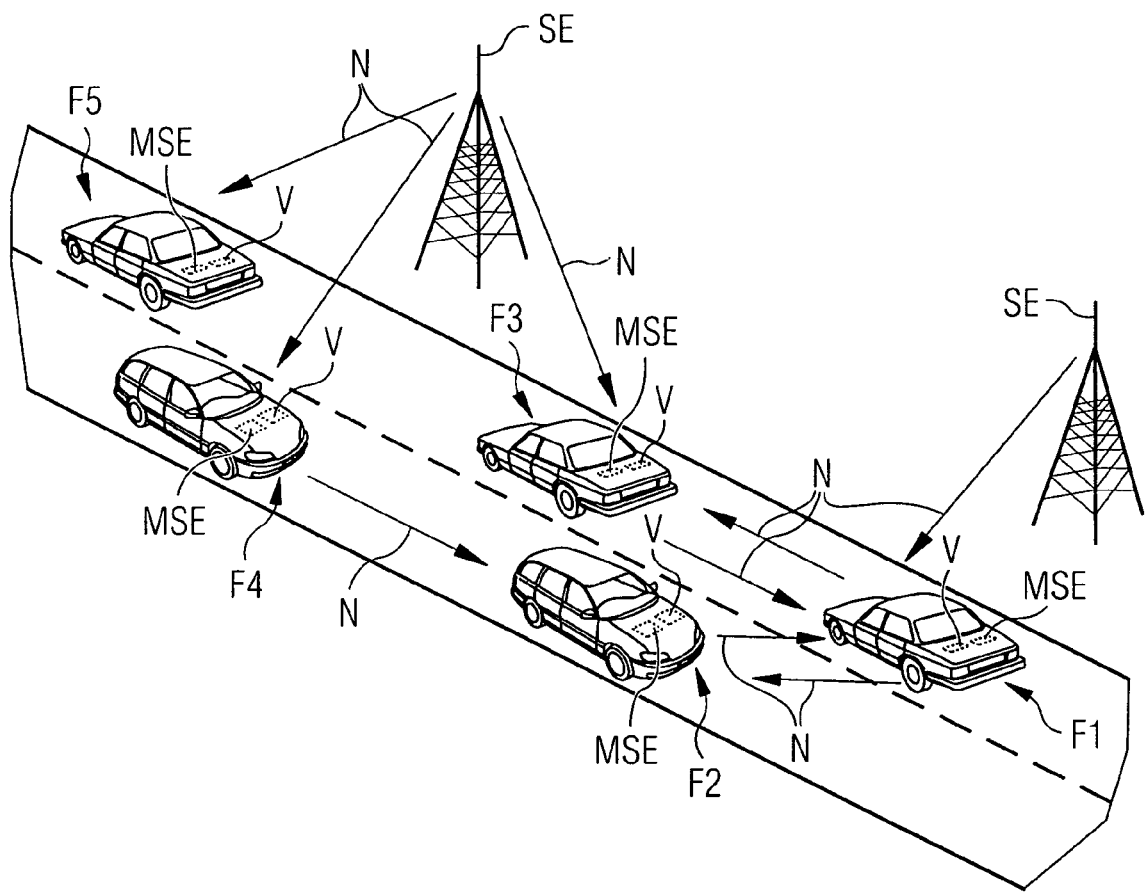
FIG. 1 shows a system.

FIG. 1 shows a system comprising transmitting units SE, MSE and receiving units. Transmitting units may be mobile transmitting units MSE or locationally fixed or stationary transmitting units SE. For example, the receiving unit preferably MSE is designed to carry out processing of messages N. In one embodiment, the transmitting units MSE are transmission adapted to transmit and receive messages N and include message processing device V. FIG. 1 illustrates, for example, a first vehicle F1, a second vehicle F2, a third vehicle F3, a fourth vehicle F4 and a fifth vehicle F5, said vehicles each comprising a message processing device V for receiving and processing messages N. Typically, mobile transmitting units MSE are arranged in vehicles. The vehicles F1 to F5 receive messages N from stationary transmitting units SE and from the other vehicles having mobile transmitting units MSE. Stationary transmitting units SE are typically roadside units, and mobile transmitting units MSE are typically onboard units. The stationary transmitting units SE are arranged spaced apart from one another along a road.

The onboard unit comprises the message processing device V. The message processing devices V are designed to receive messages N which comprise at least one authentication element A and one message content I. The message N is, preferably, a wireless short message (WSM) received by radio including traffic flow information, warnings about ice on the road, warnings about accidents, or the like. For security checking S of the message N, the message N comprises at least the one authentication element A in addition to the message content I. The authentication element A comprises one or more of a cryptographic checksum PR (message authentication code), a digital signature SIG, a digital certificate CERT, a chain of certificates, or the like. A transmitter type STYP, for example stationary transmitting unit SE or mobile transmitting unit MSE, or the integrity of the signed electronic data, is checked, by means of the digital signature SIG. As a result, manipulation of accident warnings or traffic flow information can be detected, and the driving style or profile of the vehicle route can be adapted as a function thereof.

As shown in FIG. 1, the message processing devices V of the first vehicle F1 and of the third vehicle F3 respectively receive message N from the stationary transmitting unit SE and from the other mobile transmitting units MSE. The message processing device V of the second vehicle F2 receives messages N only from other mobile transmitting units MSE. The message processing devices V of the fourth vehicle F4 and the fifth vehicle F5 receive messages N only from the stationary transmitting unit SE.

Figure 2:
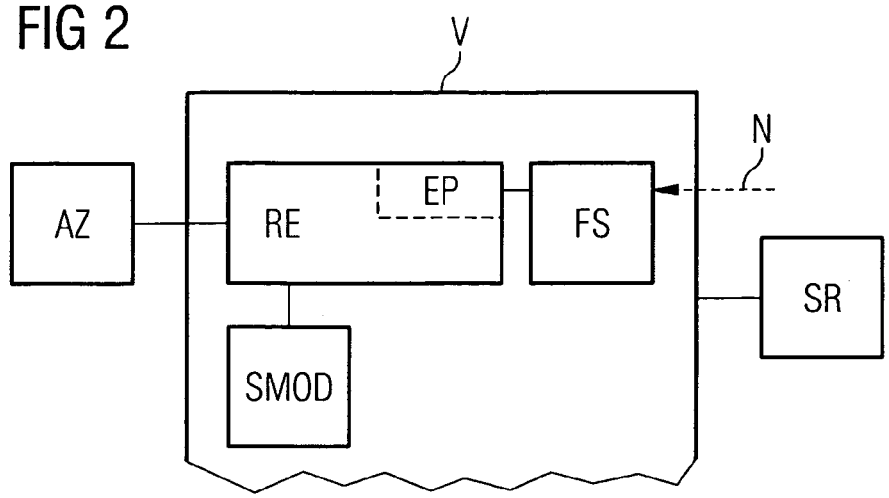
FIG. 2 shows a message processing device.

FIG. 2 shows the message processing device V for processing messages N. The message processing device V comprises at least one reception buffer EP. The message processing device V is preferably assigned a mobile transmitting unit MSE or it comprises such a unit. The mobile transmitting unit MSE is the onboard unit of a vehicle. The message N is preferably a WSM received by radio by means of a radio interface FS. The message N is stored in the reception buffer EP by the message processing device V.

In the embodiment shown in FIG. 2, the message processing device V comprises at least a first computing unit RE and at least one security module SMOD with at least one further computing unit. The message processing device V is designed to carry out the message processing for the security checking S of the respective message N in the first computing unit RE or in the security module SMOD. The message processing device V is preferably assigned at least one sensor SR which serves to determine a vehicle speed, a temperature of the surroundings or water droplets on a windshield. The message processing device V is assigned a display unit AZ on which information can be output such as a warning indication of ice on the road, an accident, or the like. In one embodiment, the message processing device further comprises an audio output module.

Figure 3:
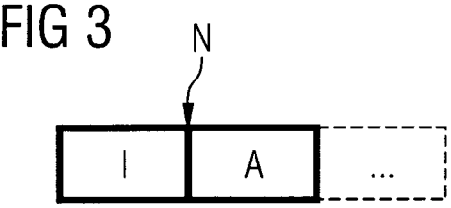
FIG. 3 is a schematic layout of a message.

FIG. 3 shows an exemplary schematic layout of the message N. The message N is a WSM and has fields with different elements. The message N comprises at least the one authentication element A and message content I. The vehicle receives messages N from other vehicles, the mobile transmitting units MSE or from stationary transmitting units SE, the message content comprises at least one of traffic flow information, road condition warnings, warnings of ice on the road, warnings of accidents or the like. The transmitter of the message N is detected by means of the message content I. The authentication element A comprises one or more of the cryptographic checksum PR (message authentication code), the digital signature SIG, the digital certificate CERT, the chain of certificates, or the like. The authentication element permits the checking of the electronic data of message N and the detection of manipulation of message N in the security checking S. In one embodiment, the message N comprises further elements in addition to the authentication element A and the message content I. A sequence of elements in another embodiment in the message N is different than that illustrated in FIG. 3.

Figure 4:
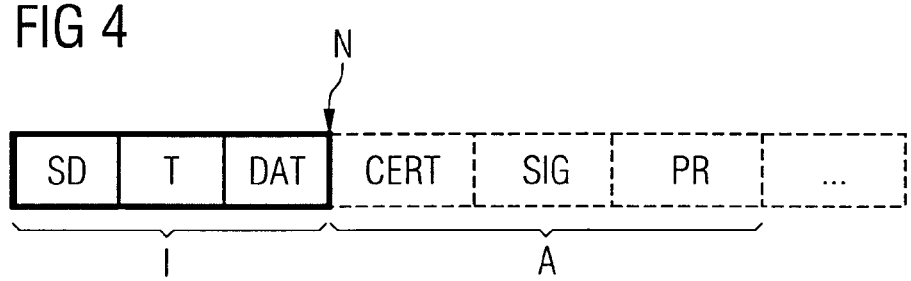
FIG. 4 is a schematic layout of a message.

FIG. 4 shows another embodiment of the message N. The message N comprises the message content I and the authentication element A. The message content I preferably comprises a transmitter SD, a transmission time T and data about the transmitter DAT. Preferably, the message content I of the message N is in unencrypted form. The authentication element A comprises one or more of the cryptographic checksum PR (message authentication code), the digital signature SIG, the digital certificate CERT, the chain of certificates, preferably containing the digital signature SIG and the like. This permits the security checking S of the message N. The transmitter first selects the message content I to be signed. A signature generating unit of the transmitter forms a hash value (checksum) for the message content and forms the digital signature SIG from the hash value using a secret signature key. The transmitter transmits the message content I and at least one authentication element A, embodied as the digital signature SIG. The receiver receives the message content I and the authentication element A. In the security checking S of the message N, the receiver verifies the digital signature SIG using a public key, which may be known to everyone and can be supplied along with the digital signature SIG and corresponds to the secret signature key. For any encrypted transmission, the transmitter requires the receiver's public key. However, it should be ensured that it is actually the receiver's key and not a falsification by a person attempting to commit deception. Digital certificates CERT which confirm the authenticity of a public key and its permissible field of application and validity are used for this. The receiver can assign the public key to an identity (for example a person, an organization) by means of the digital certificate CERT, and confirm this. The digital certificate CERT is itself protected by a further digital signature whose authenticity can be checked with the public key of the issuer of the certificate. In order to check the authenticity of the issuer's key, a digital certificate is in turn required. In this way, a chain of digital certificates can be established, which is a chain of certificates that confirms the authenticity of the public key by which the preceding certificate can be checked. However, the parties to the communication must be able to rely on the authenticity of the last certificate without a further certificate. Preferably, there is one uppermost certification body which all the participating parties trust. The digital certificates are preferably issued by trustworthy organizations or bodies so that the users can rely on the information contained in the certificates. If the checking of the digital signature SIG is successful, the message content I has not been changed (integrity) and the transmitter has been verified (authentication). As a result of the digital signature SIG, the transmitter is identified and the integrity of the signed, electronic data can be checked. If the public key has been assigned to the transmitter with a digital certificate CERT, the transmitter can be identified by means of its public key by using a certificate record which is available, for example, on the Internet.

Other security checks S of the message N which are known to a person skilled in the art are also conceivable by means of the authentication element A.

The message N can also comprise further elements. The sequence of the elements in the message N may be different than that illustrated in FIG. 4.

Figure 5:
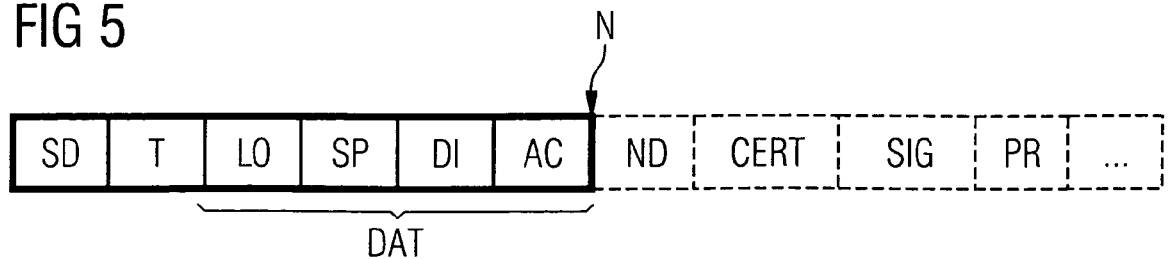
FIG. 5 is a schematic layout of a message.

FIG. 5 shows the exemplary schematic layout of the message N in more detail. The message N preferably comprises the transmitter SD, the transmission time T, a location LO, a speed SP, a direction of travel DI and an acceleration AC, wherein the location LO, the speed SP, the direction of travel DI and the acceleration AC form the data about the transmitter DAT. In addition, the message content I can also have data ND. Data ND is, for example, traffic flow information or safety-related information, for example a warning about ice on the road, a warning about an accident or the like. By means of the data ND, vehicles are warned by stationary transmitting vehicles traveling ahead, or oncoming vehicles, about hazardous situations owing to ice on the road, poor visibility or obstacles on the road or the like. This permits accidents to be avoided in a preventive fashion. The message content I of the message N is preferably available in unencrypted form. Furthermore, the authentication element A of the message N comprises the cryptographic checksum PR (message authentication code) and/or the digital certificate CERT and/or the digital signature SIG and/or the chain of certificates.

The message N can comprise further elements. In addition, the sequence of the elements in the message N can also be different than that illustrated in FIG. 5.

FIG. 6 is a flowchart of a program for receiving the messages N and determining characteristic variables of priorities, which flowchart is processed in the respective message processing device V. The program starts at a step S1. If a current message N_A is received in step S2. The message N_A is stored in the reception buffer EP in step S3. In step S4 message N_A is checked for the message content I and at least one authentication element A. If this is not the case, the step S2 is run again. If the message N_A has the message content I and the authentication element A, a characteristic variable P_S of a priority for the security checking S of the current message N_A is determined as a function of the message content I in step S5. As a result of the determination of the characteristic variable P_S, it is possible to define a processing sequence, and processing of the current message N_A can be adapted to specific requirements. The determination of the characteristic variable P_S comprises pre-processing the message content I. The pre-processing of the message content I comprises determination of the transmitter SD and/or of key words of the message content I.

The characteristic variable P_S is preferably determined as a function of the authentication element A of the message N_A. Since, for example, the transmitter SD is identified by means of the digital signature SIG, this permits the security checking S to be carried out as a function of already known transmitters SD. In the case of already known transmitters SD the security checking can be shifted to a later time and other security checks S of messages N with unknown transmitters SD can be preferred. In particular, the characteristic variable P_S is determined as a function of a predefined transmitter type STYP. In this way, messages from a specific transmitter type STYP can be processed with preference. For example, by means of the digital certificate CERT it is possible to detect whether the transmitter of the current message N_A is the mobile transmitting unit MSE or the locationally fixed transmitting unit SE. In particular, if the transmitter STYP is a locationally fixed transmitting unit SE, the current message N_A is assigned a characteristic variable P_S brings about the preferred processing over the messages N_EP that are in the reception buffer EP and have been transmitted by a mobile transmitting unit MSE. In this example, the stationary transmitting unit SE is preferably a roadside unit, and the mobile transmitting unit MSE is preferably an onboard unit of a vehicle.

The characteristic variable P_S of the message N_A is preferably determined as a function of an imminent hazardous situation GS. The imminent hazardous situation is identified as a function of the message content I of the current message N_A or of further message contents of other messages N. The determination of the imminent hazardous situation GS comprises detection of imminent vehicle collisions. In this way, security checks S can be carried out only when a collision is being considered. If a collision is being taken into account, the current message N_A is assigned a characteristic variable P_S that brings about the preferred processing over the messages N_EP in the reception buffer EP. That is to say only security checking S of the messages N which have led to the detection of the imminent collision occurs.

Further, the value of the characteristic variable P_S can be changed in such a way that processing of the current message N_A for the security checking S is preferred over processing of further messages N_EP in the reception buffer EP. In this way, it is possible that messages N from vehicles for which until now no probability, or only a small probability, of a collision has been taken into account, are classified as relevant with respect to a risk of a collision as a function of the message content I.

The characteristic variable of the priority P_S is preferably determined as a function of a type of the message content I. As a result, if the current message N_A contains a warning of an accident, said message N_A is preferably processed with preference over messages N_EP, which are in the reception buffer EP and which have weather information. This improves safety in road traffic.

The characteristic variable of the priority P_S is determined, in particular, as a function of a relevance of the message content I for a predefined geographic region GEO. The predefined geographic region GEO can be for example, the location of the receiver within the immediate surroundings. As a result, the current message N_A can be processed with preference over the messages N_EP which are in the reception buffer EP and which relate to locations which are further away. It is also possible, for example, for the direction of travel and speed of the receiver to be evaluated in such a way that a region which will be traveled through in the near future is determined, and messages N which relate to this region can be processed with preference. In addition, different geographic regions GEO can be predefined for different types of message contents I, for example, a larger geographic region GEO can be predefined for traffic flow information than for safety-related information.

The characteristic variable of the priority P_S is preferably determined as a function of available information IGEO about the predefined geographic region GEO. In particular, the information IGEO is made available independently of the current message N_A. The advantage is that as a result the current message N_A can be processed with preference if it relates to a geographic region GEO about which no information IGEO, or only a little information IGEO, is available. This can be done independently of other aspects of the type of the message content I of the current message N_A.

Furthermore, characteristic variable P_S is preferably determined as a function of sensor data SRD of at least one sensor SR which is assigned to the message processing device V. The sensor SR is a sensor that determines the speed or a temperature of the surroundings of the vehicle which has received the current message N_A. As a result, if the message N_A only has message contents I which are already known as a result of sensor data SRD, said message N_A can, for example be assigned such a characteristic variable P_S so that the processing of the current message N_A is postponed. For example, as a result an incoming warning of a traffic jam is processed later if the vehicle is already stationary.

The characteristic variable P_S, the priority of the security of the message N_A, is preferably determined as a function of a difference between the message content I and further message contents I_EP of the messages N_EP which are stored in the reception buffer. In this way, the current message N_A can be combined with further unprocessed messages N_EP which have a similar message content I_EP and of which individual messages are preferred within the scope of the further message processing. Similar message contents I occurs, for example, if they are in the same context. An example of similar message contents I are two message contents I that each contain temperature data on the surroundings and the temperature data is the same or differs only slightly, for example by less than 1 Kelvin. In particular, for this purpose, a bandwidth such as, for example, 1 Kelvin temperature difference can be specified which defines under which conditions two message contents I are similar.

In an optional step S6, a characteristic variable P_I, a priority for the message content I of the current message N_A, is determined as a function of the message content I.

As a result of the determination of the characteristic variable P_I, it is possible to define a processing sequence of message contents I, I_EP, and processing of the message content I of the current message N_A is adapted to specific requirements. The determination of the characteristic variable P_I as a function of the message content I comprises pre-processing the message content I. The pre-processing of the message content I of the current message N_A comprises, for example, determination of the transmitter SD and/or of key words of the message content I.

The characteristic variable P_I is preferably determined as a function of a difference between the message content I and further message contents I_EP of the messages N_EP in the reception buffer. In this way, the current message N_A can be combined with further unprocessed messages N_EP which have a similar message content I_EP and of which individual messages are preferred within the scope of the further message processing. Similar message contents I occur, for example, if they are in the same context. An example of similar message contents I are two message contents I which each contain temperature data on the surroundings and in which the temperature data is the same or only differ slightly, for example, by less than 1 Kelvin. In particular, for this purpose a bandwidth such as, for example, 1 Kelvin temperature difference can be specified which defines under which conditions two message contents I are similar.

The characteristic variable P_I is preferably determined as a function of the authentication element A of the current message N_A. Since, for example, the transmitter SD can be identified by means of the digital signature SIG, this permits the processing with respect to the message content I to be performed as a function of the transmitter SD. For a specific transmitter SD the processing with respect to the message content I of the current message N_A can be preferred over the processing with respect to the message contents I_EP of the further messages N_EP in the reception buffer. In particular, the characteristic variable P_I of the current message N_A is determined as a function of a predefined transmitter type STYP. In this way, messages from a specific transmitter type STYP, for example the mobile transmitting unit MSE or the stationary transmitting unit SE, can be processed with preference with respect to the message content I. In particular, if the transmitter type STYP is a stationary transmitting unit SE, the current message N_A is processed with preference over the messages N_EP which are in the reception buffer and which have been transmitted by a mobile transmitting unit MSE. In this example, the locationally fixed transmitting unit SE is preferably a roadside unit, and the mobile transmitting unit MSE is preferably an onboard unit of a vehicle.

The characteristic variable P_I of the current message N_A is determined, in particular, as a function of a relevance of the message content I for the predefined geographic region GEO. The predefined geographic region GEO can be, for example, the location of the receiver within the immediate surroundings. As a result, the current message N_A can be processed with preference with respect to the message content I over the messages N_EP which are in the reception buffer EP and which relate to more distant locations. It is also possible to evaluate the direction of travel and speed of the receiver in such a way that a region which will be traveled through in the near future is determined, and messages N which relate to this region can be processed with preference over the message content I. In addition, different geographic regions GEO can be predefined for different types of message contents I, for example a larger geographic region GEO can be predefined for traffic flow information than for safety-related information.

The characteristic variable P_I of the current message N_A is preferably determined as a function of available information IGEO about the predefined geographic region GEO. In particular, the information IGEO is made available independently of the current message N_A. The advantage is that the current message N_A can be processed with preference to the message content I if said message N_A relates to a geographic region GEO about which no information IGEO, or only too little information IGEO, is available. This can occur independently of other aspects of the type of the message content I of the current message N_A.

Furthermore, the characteristic variable P_I of the current message N_A can be determined as a function of the sensor data SRD of the sensor SR which is assigned to the message processing device V. The sensor SR is, in one embodiment, a sensor that determines the speed or the temperature of the surroundings of the vehicle which has received the current message N_A. As a result, if the current message N_A only has message contents I which are already known as a result of sensor data SRD, said message N_A can be assigned a characteristic variable P_I of the priority for the message contents I that the processing of the current message N_A with respect to the message contents I is postponed. For example, an incoming warning of a traffic jam is processed later if the vehicle is already stationary or is moving at a low speed, for example, less than 10 km/h.

As a result of the determination of the characteristic variable P_S, the priority for the security checking of the current message N_A, and optionally of the characteristic variable P_I, the priority for the message content I, in a step S7 the current message N_A is renamed, with its message content I and the authentication element A, as an element of the tuple of the messages N_EP in the reception buffer with at least one determined characteristic variable of the priority. Each element of the tuple of the message N_EP in the reception buffer which each comprise the message content I_EP and the authentication element A_EP is therefore assigned the respective determined characteristic variable P_S of the priority for the security checking S and optionally the respective determined characteristic variable P_I of the priority for the message content I.

In addition, further steps may be provided for receiving the messages N and determining characteristic variables of priorities.

In addition to the reception of the messages N and determination of characteristic variables of priorities as a basis for defining a processing sequence for further message processing of the messages N, other program sequences which are known to a person skilled in the art are also conceivable for receiving messages and determining characteristic variables of priorities.

FIG. 7 is a flowchart for processing received messages N by means of the characteristic variables of priorities. The program begins in a step S8. In a step S9, a message N_B, which is to be processed, is determined by a sequencing controller AS as a function of the elements of the tuple of the messages N_EP in the reception buffer. In this context, each element of the tuple of the messages N_EP in the reception buffer respectively comprises the message content I_EP, the authentication element A_EP, the respectively determined characteristic variable P_S, the priority for the security checking S, and/or the respectively determined characteristic variable P_I, the priority for the message content I. The message N_B, which is to be processed, is determined by the sequencing controller AS from the messages N_EP as a function of the characteristic variables P_S and/or the characteristic variables P_I. The message N_B which is to be processed is preferably determined by the sequencing controller AS firstly from the messages N_EP with the highest priority. The determination of the message N_B which is to be processed from the messages N_EP starts with the message N_B with the highest characteristic variable P_S. It is also possible for the determination of the message N_B which is to be processed from the messages N_EP to start with the message N_B with the highest characteristic variable P_I. A further possibility is for the determination of the message N_B which is to be processed to start with the message N_B with the highest value, for example with the highest sum, by means of a logic operation, for example an addition, of the respective characteristic variables P_S to the respective characteristic variables P_I. Furthermore, the respective characteristic variables P_S, the priority for the security checks, S and the respective characteristic variables P_I, the priority for the message contents I, are preferably treated equally in order to determine the message N_B which is to be processed.

In a step S10, the message processing of the message N_B for the security checking S is performed. The security checking S of the message N_B is carried out by means of the authentication element A_EP. In the security checking S of the message N_B which is to be processed, the digital signature SIG is preferably verified using a public key supplied along with digital signature SIG. For each encrypted transmission, the transmitter SD therefore requires the public key of the receiver. By means of the digital certificate CERT, the authenticity of the public key and the acceptable field of application and field of validity can be confirmed. The digital certificate CERT is itself protected by a digital signature whose genuineness can be checked with the public key of the issuer of the certificate. In order to check the authenticity of the issuer's key, a digital certificate is in turn required. In this way, a chain of digital certificates can be established, this being the chain of certificates which respectively confirms the authenticity of the public key with which the preceding certificate can be checked. However, the parties to the communication must be able to rely on the genuineness of the last certificate without a further certificate. As a result, an uppermost certification body is required which all the participating parties trust. If the checking of the digital signature SIG is successful, the message content has not been changed (authentication) and the security checking S of the message N_B which is to be processed is therefore terminated.

The security checking S of the message N_B can be carried out in the message processing device V in the first computing unit RE or in the security module SMOD with the further computing unit as a function of the value of the characteristic variable P_S, the priority for the security checking S of the message N_B which is to be processed.

Other security checks S of the message N_B to be processed which are known to a person skilled in the art and which use the authentication element A_EP are also conceivable.

Furthermore, it is possible for the security checking S to be carried out only in a reduced form as a function of the authentication element A_EP of the message N_B which is to be processed. In this way, security checks S can be carried out in a simplified fashion, for example in the case of known digital certificates CERT. Known chains of certificates are, for example, not checked completely.

The security checking S of the message N_B which is to be processed can also be avoided, for example, in the case of known transmitters SD which have already been checked.

In a step S11, the message processing is carried out with respect to the message content I_EP of the message N_B. The useful data ND of the message content I_EP is preferably evaluated. This comprises the detection and display of an imminent hazardous situation GS such as a collision, a traffic jam beyond a bend, ice on the road or the like.

The message processing of the message N_B which is to be processed with respect to the message content I_EP can run in parallel with the security checking S of the message N_B. This permits rapid message processing and at the same time accurate sensing of the surroundings.

In particular, the message processing with respect to the message content I_EP of the message N_B can be avoided, in the case of already known message contents I_EP.

FIG. 8 is a flowchart for rejecting received messages N based on characteristic variables of priorities. The program starts in a step S12. In a step S13, a number ANZ_N_EP of the messages N_EP in the reception buffer is determined from the tuple of the messages N_EP in the reception buffer. In this context, each element of the tuple of the messages N_EP in the reception buffer respectively comprises the message content I_EP, the authentication element A_EP, the respectively determined characteristic variable P_S, the priority for the security checking S, and/or the respectively determined characteristic variable P_I, the priority for the message content I.

Step S14 checks whether the number ANZ_N_EP exceeds a first predefined threshold value THD. The threshold value THD is, for example, selected in such a way that 90% of the storage capacity of the reception buffer EP is occupied by the messages N_EP. If the first threshold value THD is not exceeded, the program continues with a step S15. In the step S15 it is checked whether the capacity utilization (AL) of the first computing unit (RE) of the message processing device (V) exceeds a second predefined threshold value (THD_2). The second threshold value (THD_2) is, for example, selected in such a way that 90% of the capacity of the first computing unit (RE) of the message processing device (V) is utilized. If the second threshold value THD_2 is not exceeded, the program continues with the step S13. If the number ANZ_N_exceeds the first threshold value THD, or if the capacity utilization (AL) of the first computing unit (RE) exceeds the second threshold value THD_2, a message N_W which is to be rejected is determined in step S16. The message N_W which is to be rejected is preferably determined as a function of the respective characteristic variables P_S, the priority for the security checking S of the messages N_EP, and/or of the respective characteristic variable P_I, the priority for the message contents I_EP of the messages N_EP. In particular, the determination of the message N_W which is to be rejected from the messages N_EP starts with the message N_W with the lowest priority. The determination of the message N_W which is to be rejected from the messages N_EP preferably starts with the message N_W with the lowest characteristic variable P_S of the priority for the security checking S. It is also possible for the determination of the message N_W which is to be rejected from the messages N_EP to start with the message N_W with the lowest characteristic variable P_I, the priority for the message content I. A further possibility is for the determination of the message N_W which is to be rejected to start with the message N_W with the lowest value, for example, with the lowest sum, by means of a logic operation, for example an addition, of the respective characteristic variables P_S, the priority for the security checks S, to the respective characteristic variables P_I, the priority for the message contents I. Furthermore, the respective characteristic variables P_S, the priority for the security checks S, and the respective characteristic variables P_I, the priority for the message contents I, are preferably treated equally in order to determine the message N_W which is to be rejected. The message N_W which is to be rejected is rejected in a step S17.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for processing roadside traffic/vehicle flow messages in a message processing device having at least one reception buffer, the reception buffer storing a plurality of messages, wherein each roadside traffic/vehicle flow message comprises at least one authentication element and a message content, the method comprising:
    receiving in a receiver of the message processing device, the plural roadside traffic/vehicle flow messages;
    determining a characteristic variable of a priority for security checking each of the plurality of roadside traffic/vehicle flow messages based on respective message content of each of the plurality of roadside traffic/vehicle flow messages;
    defining a processing sequence for security checking the plurality of roadside traffic/vehicle flow messages based at least in part on the at least one respective authentication element and the characteristic variable of the priority for security checking of each of the plurality of roadside traffic/vehicle flow messages stored in the reception buffer; and
    performing the security checking of the roadside traffic/vehicle flow messages in accordance with the defined processing sequence.

2. The method according to claim 1, wherein the priority for security checking for each of the plurality of roadside traffic/vehicle flow messages is based at least in part on the respective at least one authentication element of each roadside traffic/vehicle flow message.

3. The method according to claim 1, wherein the priority for security checking of at least one of the plurality of roadside traffic/vehicle flow messages is based at least in part on an imminent hazard, the imminent hazard being defined in a message content of at least one of the plurality of roadside traffic/vehicle flow messages.

4. The method according to claim 1, further comprising modifying the priority for security checking,
    wherein priority for security checking of a recently received roadside traffic/vehicle flow message has a higher priority for security checking than the priority for security checking of the other roadside traffic/vehicle flow messages in the reception buffer.

5. The method according to claim 1, wherein the priority for security checking of at least one of the plurality of roadside traffic/vehicle flow messages is based at least in part on a type of message content.

6. The method according to claim 1, wherein the priority for security checking of at least one of the plurality of roadside traffic/vehicle flow messages is based at least in part on a relevance of the roadside traffic/vehicle flow message content for a predefined geographic region.

7. The method according to claim 6, wherein the priority for security checking of the at least one of the plurality of roadside traffic/vehicle flow messages is determined based at least in part on available information for the predefined geographic region.

8. The method according to claim 1, wherein the priority for security checking is based at least in part on sensor data of at least one sensor.

9. The method according to claim 1, wherein the priority for security checking is based at least in part on a difference between the message content of a first roadside traffic/vehicle flow message stored in the reception buffer and the message contents of a remaining plurality of roadside traffic/vehicle flow messages stored in the reception buffer.

10. The method according to claim 1, wherein the priority for security checking is based at least in part on a predefined transmitter type.

11. The method according to claim 10, wherein the priority for security checking for each of the plurality of roadside traffic/vehicle flow messages stored in the buffer from a stationary transmitter has a higher priority than a roadside traffic/vehicle flow message received from a mobile transmitter.

12. The method according to claim 1, further comprising rejecting the roadside traffic/vehicle flow messages stored in the reception buffer based at least in part on a storage capacity of the reception buffer and the priority for security checking of the roadside traffic/vehicle flow messages stored in the reception buffer.

13. The method according to claim 1, further comprising rejecting the roadside traffic/vehicle flow messages stored in the reception buffer based at least in part on a capacity utilization of a first computing unit of the message processing device and the priority for security checking of the roadside traffic/vehicle flow messages stored in the reception buffer.

14. The method according to claim 1, wherein the security checking as a function of the at least one authentication element is performed in a reduced form.

15. The method according to claim 1, wherein the security checking is performed in at least one of a first computing unit or in a security module based at least in part on the priority for security checking for the roadside traffic/vehicle flow message.

16. The method according to claim 1, further comprising:
    determining the priority for message content of the plurality of roadside traffic/vehicle flow messages in the respective buffers based at least in part on the message content of each of the plurality of messages,
    wherein the processing sequence is based at least in part on the priority for security checking of the roadside traffic/vehicle flow messages stored in the reception buffer and the priority for message content stored in the reception buffer.

17. The method according to claim 16, wherein the priority for message content is determined as a function of a difference between the message content of a first roadside traffic/vehicle flow message stored in the receptive buffer and the message contents of a remaining plurality of roadside traffic/vehicle flow messages stored in the reception buffer.

18. The method according to claim 16, wherein the priority for message content of the first message is determined as a function of the at least one authentication element of the first roadside traffic/vehicle flow message.

19. The method according to claim 16, wherein the priority for message content of the is based at least in part on a predefined transmitter type.

20. The method according to claim 16, further comprising rejecting the roadside traffic/vehicle flow messages stored in the reception buffer based at least in part on a storage capacity of the reception buffer and the priority for message content of the roadside traffic/vehicle flow messages stored in the reception buffer.

21. The method according to claim 16, further comprising rejecting the roadside traffic/vehicle flow messages stored in the reception buffer based at least in part on a capacity utilization of a first computing unit of the message processing device and the priority for message content of the roadside traffic/vehicle flow messages stored in the reception buffer.

22. The method according to claim 1, further comprising:
receiving a first roadside traffic/vehicle flow message;
storing the first roadside traffic/vehicle flow message in the reception buffer; and
determining a priority for security checking the first roadside traffic/vehicle flow message based at least in part on a message content of the first roadside traffic/vehicle flow message,
wherein said step of defining a processing sequence for security checking the plurality of roadside traffic/vehicle flow messages is performed after said step of storing the first message in the reception buffer.

23. A message processing device for processing roadside traffic/vehicle flow messages, wherein each roadside traffic/vehicle flow message comprises at least one authentication element and message content, wherein the roadside traffic/vehicle flow message processing device comprises:
a receiver to receive the roadside traffic/vehicle flow message;
at least one reception buffer to store the roadside traffic/vehicle flow message;
a first computing unit to determine a characteristic variable of a priority for security checking of the roadside traffic/vehicle flow message as a function of the message content; and
a second computing unit configured to define a processing sequence for further roadside traffic/vehicle flow message processing for the security checking based at least in part on the at least on the authentication element and the characteristic variable of the priority for security checking of the roadside traffic/vehicle flow messages stored in the reception buffer; and
a third computing unit performing the security checking of the roadside traffic/vehicle flow messages in accordance with the defined processing sequence.

24. The message processing device according to claim 23, further comprising:
at least one fourth computing unit; and
at least one security module with at least one further computing unit,
wherein the security checking is performed in at least one of the fourth computing unit or in the security module based at least in part on the priority for security checking of the roadside traffic/vehicle flow message.

* * * * *